United States Patent [19]
Jury et al.

[11] 3,932,249
[45] Jan. 13, 1976

[54] MESH REINFORCED ELASTOMERIC POLYMERS

[75] Inventors: Harold Rex Jury, Norwood; John Henry Hay, Panorama, both of Australia

[73] Assignee: Comalco (J. & S.) Pty. Limited, Victoria, Australia

[22] Filed: Apr. 10, 1974

[21] Appl. No.: 459,670

[30] Foreign Application Priority Data
Apr. 13, 1973 Australia.............................. 2979/73

[52] U.S. Cl. .................... 156/213; 29/485; 29/492; 72/260; 72/263; 156/214; 156/307; 156/286; 428/116; 428/184
[51] Int. Cl.².......................................... B29C 24/00
[58] Field of Search .......... 156/285, 286, 295, 299, 156/197, 306, 308, 307, 338, 213, 214; 161/161; 264/102, 347; 29/484, 485, 492, 29/527.1; 140/112; 72/253, 260, 263, 72/269, 281, 285; 428/116, 184

[56] References Cited
UNITED STATES PATENTS

| | | | |
|---|---|---|---|
| 2,805,974 | 9/1957 | Brucker............................... | 156/286 |
| 2,978,806 | 4/1961 | Herbert, Jr. ......................... | 156/286 |
| 3,067,507 | 12/1962 | Titus................................... | 156/286 |
| 3,072,520 | 1/1963 | Groth.................................. | 156/286 |
| 3,167,856 | 2/1965 | Zoller ................................. | 29/527.1 |
| 3,284,891 | 11/1966 | Whitney.............................. | 29/484 |
| 3,425,885 | 2/1969 | Webb.................................. | 264/102 |
| 3,585,100 | 6/1971 | Greenless............................ | 156/286 |
| 3,679,529 | 7/1972 | Prusinski et al. ................... | 161/161 |
| 3,703,422 | 11/1972 | Yoshino............................... | 156/286 |
| 3,767,353 | 10/1973 | Gaffney .............................. | 156/500 |
| 3,770,560 | 11/1973 | Elder et al. ......................... | 161/161 |
| 3,775,214 | 11/1973 | Winters............................... | 156/286 |
| 3,825,163 | 7/1974 | Versteeg............................. | 140/112 |

*Primary Examiner*—Douglas J. Drummond
*Assistant Examiner*—Jerome W. Massie
*Attorney, Agent, or Firm*—Jay L. Chaskin, Esq.

[57] ABSTRACT

A method of forming a reinforced rubber sheet useful for the lining of pipes, acid tanks, chimneys and the like, wherein a metal grid is interposed between adhesive surfaces of each of two rubber sheets, the rubber sheets overlapping the metal grid along all edges, evacuating the air from between the sheets to thereby draw them together and also to draw them into contact with the metal grid, thereby effecting adhesion between the adhesive surfaces of the two sheets of rubber and also between the rubber sheets and the metal grid.

10 Claims, 6 Drawing Figures

MESH REINFORCED ELASTOMERIC POLYMERS

This invention relates to a method of forming a reinforced elastomeric polymer (that is a natural or synthetic rubber) wherein the reinforcing material is a metal grid, and the invention further relates to a product when produced by that method.

BACKGROUND OF THE INVENTION

The need to reinforce rubber materials with metal has been recognised for some time, and there are many instances wherein metal is embedded in rubber for stiffening purposes and in certain instances the metal is perforated so that the rubber is integral through the perforations in the metal as well as being adhered to the metal surface. It is well recognised that it is difficult to achieve a very strong adhesion between rubber and metal by "lay up" methods, and such products have therefore usually been formed by moulding the rubber on or around the metal under conditions of high pressure.

It is not feasible to mould a large sheet over a metal grid since the grid will need support within the moulding die and therefore will not be fully encased, so that the metal will be liable to acid or abrasion attack if the sheet is used, for example, for the lining of acid tanks, pipes used in mining operations and the like. In the alternative, if the rubber is merely cemented to a metal sheet, there is a danger of the rubber tearing away due to poor adhesion or the metal being subject to abrasion or chemical attack. Known adhesives usually achieve only about a 40 percent adhesion, and this diminishes above temperatures of about 70°C.

It will be recognised by those skilled in the art that the possible alternatives of utilising woven mesh, sheet metal having a large number of small perforations therein, or expanded metal for the reinforcement of rubber sheets are all subject to certain disabilities. Woven mesh and expanded metal include recesses into which the rubber is not readily deformed, and even if a moulding technique were to be utilised, there is a danger of air pockets being formed between the metal and the rubber, and these constitute weaknesses which can result in tearing of the rubber. If perforate sheet metal is used in a lay up process, the adhesion between the rubber and the imperforate portions of the metal is likely to be poor, and the area wherein the rubber penetrates through the apertures is likely to be ineffective in providing sufficient adhesion to a backing sheet (if used) to overcome the difficulty of poor adhesion to the metal. If the perforations in a sheet metal plate are increased in size to the extent that adhesion to a backing sheet becomes of significance, then there is a considerable wastage of metal from the perforated areas.

OBJECT OF THE INVENTION

The main object of this invention is to provide a relatively low cost and effectively reinforced elastomer wherein metal reinforcing is completely encased within the elastomer, so that the product is useful for the lining of pipes as for example are used in the mining industry, mining chutes, chimney stacks, acid tanks and the like.

BRIEF SUMMARY OF THE INVENTION

Briefly the invention consists of a method of forming a reinforced elastomeric polymer which comprises rendering one face of each of two sheets of elastomeric material adhesive, interposing a reinforcing grid between the sheets, the length and width of each of the sheets exceeding respectively the length and width of the reinforcing grid so that the sheets of elastomeric material overlap the grid on all sides, evacuating air from between the sheets to thereby draw the surfaces together and effect an adhesion between them. The surfaces may also be adhered to the reinforcing metal grid.

More specifically, in one form the invention consists of a method of forming a reinforced elastomeric polymer comprising forming a reinforcing metal grid to have longitudinally extending members and joining members joining the longitudinally extending members, rendering one face of each of two sheets of elastomeric material adhesive, the length and width of each of said sheets exceeding respectively the length and width of the reinforcing grid, interposing the reinforcing grid between said two sheets with the adhesive surfaces of the sheets contiguous and with the edges overlapping the edges of the metal grid on all sides, evacuating air from between the sheets to thereby draw said adhesive surfaces together around the periphery of the metal grid and between the longitudinally extending members and joining means thereof, and effecting adhesion between said adhesive surfaces.

With this invention, the metal grid may be of low cost and may be formed by deformation of a slotted and extruded member, or alternatively by welding together of metal rods. Conveniently the surfaces of the members forming the grid can form a plurality of channels for the evacuation of air, thus avoiding the formation of air pockets. Further the thicknesses of the elastomeric sheets may vary and the cross-sectional shape of the ribs may be such that the thicker sheet remains substantially planar and the thinner sheet conforms to the shape of the reinforcing grid. Conveniently the elastomeric material may be rubber and may be cured at a curing temperature of between 145°C. and 165°C., after the air is evacuated from between the sheets, although the temperature may be varied to suit different thicknesses or types of rubber.

BRIEF DESCRIPTION OF THE DRAWINGS

An embodiment of the invention is described hereunder in some detail with reference to and as illustrated in the accompanying drawings in which:

FIG. 3 also illustrates one of two sheets of elastomeric material with its edges overlapping the edges of a metal grid on all sides, and FIG. 3 also illustrates diagrammatically a vacuum pump and a conduit.

Referring to the first embodiment of FIGS. 1 to 5, a metal grid is formed by firstly extruding aluminium or aluminium alloys to form an article 10 of constant cross-sectional shape which includes a plurality of longitudinally extending ribs 11 interconnected by webs 12, the thickness of each web 12 being less than the thickness of the ribs which it interconnects.

Figure 1:
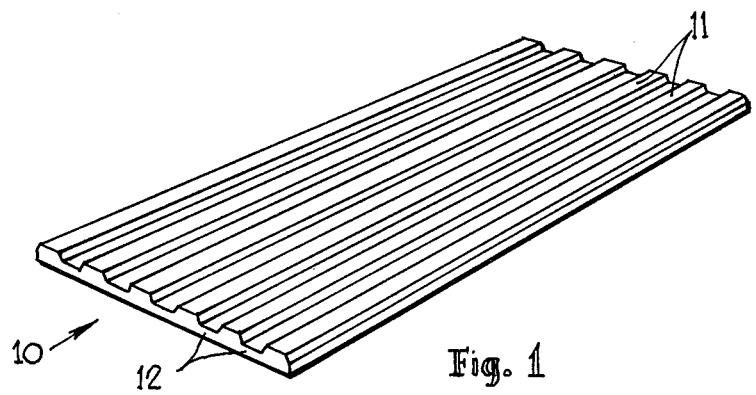
FIG. 1 is a perspective view of an article which has been formed by the extrusion of extrusile metal having a plurality of longitudinally extending ribs interconnected with webs the thickness of each which is less than the thickness of each of the ribs which it interconnects.
Figure 2:
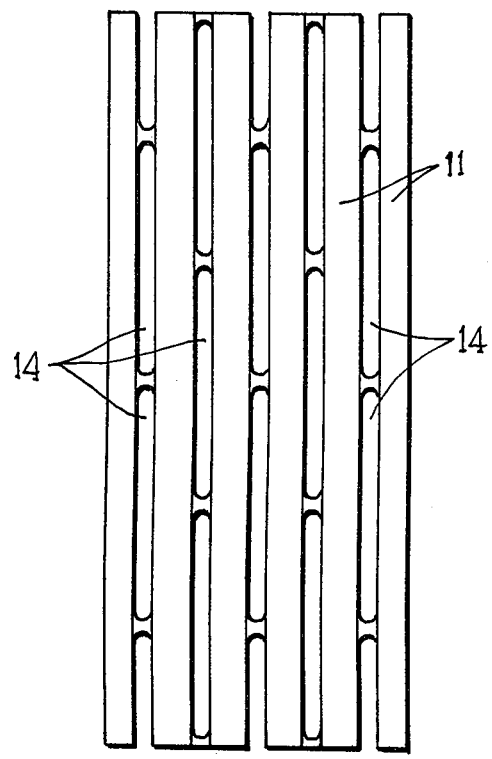
FIG. 2 is a plan of the article after it has been pierced with a row of slots in each web in staggered and overlapping relation with the slots in each adjacent web.
Figure 3:
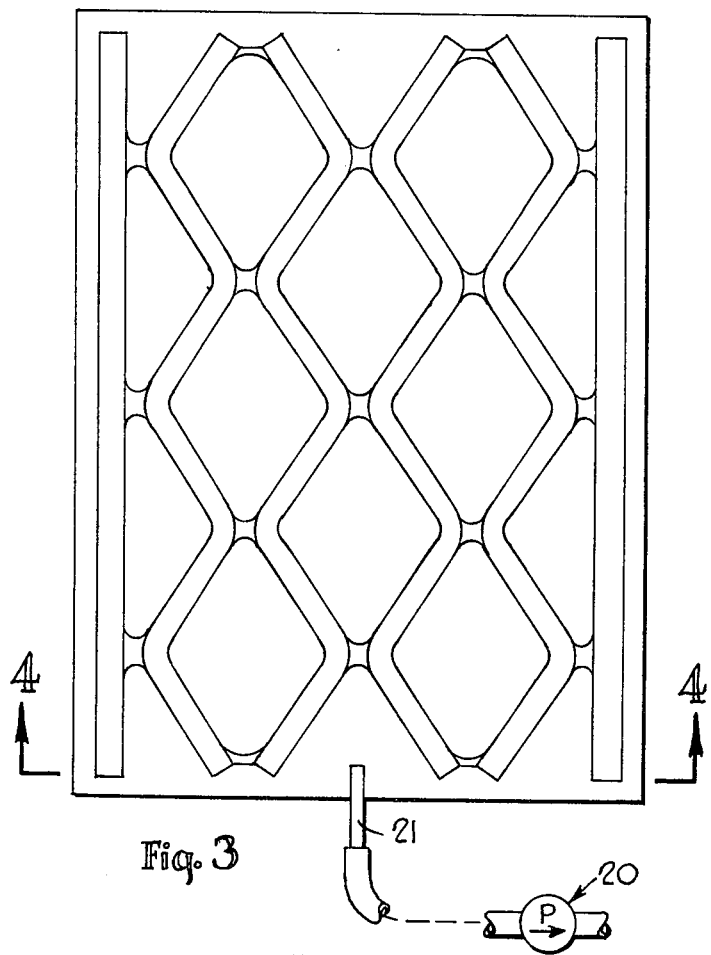
FIG. 3 is a view corresponding to FIG. 2 showing a metal grid formed by deforming the ribs of the article illustrated in FIG. 2 by moving the side edges of the article away from one another.

As shown in FIG. 2, the webs 12 are each pierced with a plurality of slots 14 which are in staggered and overlapping relation with the slots 14 of the next adjacent web, and as shown in FIG. 3 a grid is formed by moving the side edges of the article away from one another, thereby stretching the ribs 11 between the side edges. Alternatively however, the side edges may themselves be deformed and the ribs 11 may be deformed less by stretching and more by simply bending. These alternatives are available for selection, and will be selected in accordance with the need to have a continuously extending rib along each side of the grid as shown in FIG. 3.

Figure 4:
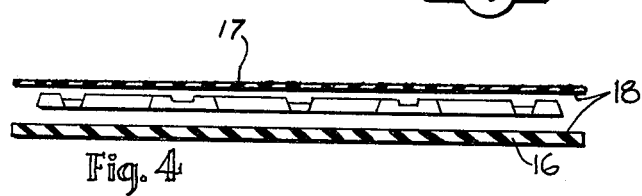
FIG. 4 is a section taken on line 4—4 of FIG. 3, but showing a second rubber sheet of less than half the thickness of the first said rubber sheet and contiguous with the other (upper) surface of the metal grid.

Two sheets of elastomeric material each then have one face rendered adhesive. As shown in FIG. 4, the lower sheet 16 is more than twice the thickness of the upper sheet 17, and the facing surfaces 18 are rendered adhesive.

As will be clearly understood by those skilled in the art, the facing surfaces may be rendered adhesive by one of at least two methods. According to one commonly used method, the sheets have applied to them a hydrocarbon or other solvent, selected from benzol, toluol or xylol and effect of this is to make the surface tacky. In the alternative, the sheets may have a rubber solution applied.

The metal of the grid is cleaned, and if the grid is of aluminium as illustrated in the first embodiment, the cleaning is conveniently effected by immersing the grid for a short period in a bath of caustic soda, rinsing, and degreasing. The grid is then coated with a chemical priming material, one suitable material being sold under the Trade Mark CHEMLOK by Hughson Chemicals, Lord Corporation, Erie, Pa., U.S.A. One of the characteristics of the product CHEMLOK is that the surfaces are not sticky or tacky, and therefore the grid may be more easily handled with the rubber sheets.

The grid is then interposed between the adhesive surfaces of the rubber as illustrated in FIG. 4, and a vacuum pump 20 is connected to the space between the sheets 16 and 17 by means of a conduit 21, whereupon a vacuum is drawn between the sheets and this urges the two sheets to come into contact with one another and with the grid.

Figure 5:
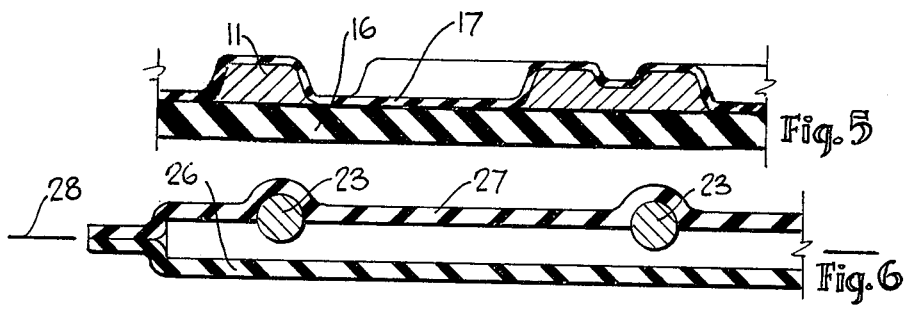
FIG. 5 is a fragmentary enlarged section illustrating the conformation of the thinner elastomeric sheet over the metal grid and in face to face relationship with the thicker sheet.

As shown more particularly in FIG. 5 the ribs 11 each have a flat base and sloping side walls which converge away from the base. The flat base is contiguous with the thicker sheet 16 and this inhibits deformation from the flat planar shape of the sheet 16, while the converging side walls facilitate conformation of the thinner sheet 17 upon the application of the vacuum.

Since the thicknesses of the webs 12 are less than the thicknesses of the ribs 11, it follows that the spaces between adjacent ribs form channels upon initial removal of air, and this reduces the danger of air pockets being formed in the final product. It is important to avoid the formation of air pockets since they will constitute points of weakness in the final product.

Figure 6:
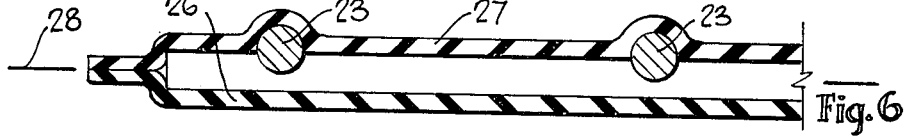
FIG. 6 illustrates an alternative embodiment wherein the metal grid is formed from circular rods which are resistance welded together.

FIG. 6 illustrates a slight variation of the above embodiment wherein the grid, instead of being formed as described above, is formed by the well known process of resistance welding rods together. The rods are designated 23, and as shown in FIG. 6 the weld is terminated before the longitudinal rods and transverse rods come into the one plane, so that once again channels exist for the passage of air. It is valuable to ensure that the surfaces of the joining members are so disposed from the common tangential planes of the surfaces of the adjacent longitudinally extending members that the air flow channels will exist.

The elastomeric material is desirably a butadiene, chloroprene, polyisoprene (natural rubber), or some synthetic rubber which is selected for a specific application. The most suitable material to be used for rendering the surfaces adhesive will be readily ascertainable by those skilled in the art either by reference to standard text books or by impirical means.

After the rubber sheets have been drawn together, and some initial adhesion has taken place the conduit 21 is removed and the product is heated in an autoclave at a temperature of between 145°C. and 165°C. (although in some cases the selection of rubber composition or thickness may require a different temperature which will be determined again by those skilled in the art, or by reference to standard text books or manufacturers instructions).

The reinforced elastomeric polymer produced by the method described above will be found to have excellent resistance to abrasion or penetration by acids or the like, so that it is useful for the lining of pipes, chutes, tanks, chimneys or other applications wherein resistance is required either to abrasion or to chemical or moisture penetration into the reinforcing material. As shown in FIG. 5, one of the surfaces of the product is substantially smooth and without projections or protuberances which might otherwise cause localised wear on the rubber. It will be appreciated that the grid is ductile and thereby the product can be formed to a shape after it has been vulcanised or cured.

The product may if desired be quilted with sponge rubber or other resilient polymeric material, and instead of the curing being effected slowly by the application of heat, it can be also effected by the application of external pressure (for example passing the product between rolls, or by both). If rollers are used, at least one of the rollers should be provided with a cylindrical pad of resilient material to enable it to apply pressure over the "valleys" in the thin rubber sheet.

As shown in FIG. 6, the rubber sheets which are therein designated 26 and 27 are of identical thickness so that the product is substantially symmetrical about a central plane designated 28.

The product of this invention may be a self supporting sheet, and therefore may be fixed in place by fastening means, thus avoiding the need to utilise adhesives. For example, it may be bolted into place without exposing the metal grid. This can result in considerable labour saving.

While the invention has been described with respect to specific embodiments, it should be understood that various changes and modifications can be made therein without departing from the scope and spirit of the invention.

We claim:

1. A method of forming a reinforced elastomeric polymer comprising forming a reinforcing metal grid to have longitudinally extending members and joining members joining the longitudinally extending members, the surfaces of the joining members being displaced from the common tangential planes of the surfaces of adjacent said longitudinally extending members, rendering one face of each of two sheets of elastomeric material adhesive, the length and width of each of said sheets exceeding respectively the length and width of the reinforcing grid, interposing the reinforcing grid between said two sheets with the adhesive surfaces of the sheets contiguous and lying in planes displaced from said common tangential planes, and with the edges overlapping the edges of the metal grid on all sides, thereby forming air flow channels between and defined by the longitudinal members and said adhesive surfaces, evacuating air through said air flow channels and from between the sheets to thereby draw said adhesive surfaces together around the periphery of the metal grid and in the areas existing between the longitudinally extending members and joining members, and effecting adhesion between said adhesive surfaces.

2. A method according to claim 1 wherein the metal grid is formed by extruding extrusile metal to form an article of constant cross sectional shape and having a plurality of longitudinally extending ribs interconnected with webs the thickness of each of which is less than the thickness of each of the ribs which it interconnects, piercing a row of slots in each web in staggered and overlapping relation with the slots in each adjacent web and deforming the ribs by moving the side edges of the article away from one another.

3. A method according to claim 2 wherein the cross sectional shape of each rib includes a flat base and sloping side walls which converge away from the base.

4. A method according to claim 2 wherein said extrusile metal is aluminium or an aluminium alloy.

5. A method according to claim 1 wherein the metal grid is formed by resistance welding rods together so that the common tangential planes of the longitudinally extending members are not coincident with the common tangential planes of the transversely extending members.

6. A method according to claim 1 comprising cleaning the metal grid and applying a coating of chemical priming material to the surface of the metal grid before interposing the metal grid between the rubber sheets.

7. A method according to claim 1 wherein said elastomeric material is rubber.

8. A method according to claim 7 wherein the thickness of one of said sheets is at least twice as great as the thickness of the other sheet.

9. A method according to claim 7 comprising heating the rubber to a curing temperature after the air has been evacuated from between the sheets and the adhesive surfaces of the sheets are contiguous.

10. A method according to claim 7 comprising curing the rubber at a temperature between 145°C. and 165°C. after the air has been evacuated from between the sheets and the adhesive surfaces of the sheets are contiguous.

* * * * *